United States Patent [19]
Roedel

[11] 3,775,809
[45] Dec. 4, 1973

[54] PATTY-FORMER

[76] Inventor: Paul Roedel, 39 Muncey St., Lindenhurst, N.Y.

[22] Filed: July 26, 1971

[21] Appl. No.: 166,228

Related U.S. Application Data

[62] Division of Ser. No. 790,538, Jan. 13, 1969, Pat. No. 3,594,854.

[52] U.S. Cl. .................................................... 17/32
[51] Int. Cl. ............................................. A22c 7/00
[58] Field of Search ......................................... 17/32

[56] References Cited
UNITED STATES PATENTS

| | | | |
|---|---|---|---|
| 2,896,528 | 7/1959 | Walters et al. | 17/32 X |
| 2,717,415 | 9/1955 | Gerhart | 17/32 |
| 2,081,455 | 5/1937 | Holly | 17/32 |
| 2,076,488 | 4/1937 | Wiley | 17/32 |
| 3,462,793 | 8/1969 | Sumption | 17/34 X |

Primary Examiner—Robert W. Michell
Assistant Examiner—John F. Pitrelli
Attorney—Arthur T. Groeninger

[57] ABSTRACT

A patty former comprising a tublar body member adapted to have ground meat packed therein, the tubular body member including a wall having a plurality of parallel slots extending about a portion of the circumference thereof, a divider plate adapted to be selectively inserted through the slots in the wall of the tubular body member to divide the meat into patties, a separating member adapted to be releasably secured to the divider plate so that upon removal of the divider plate the separating member is released and maintains the patties in a separated state.

5 Claims, 8 Drawing Figures

PATENTED DEC 4 1973 3,775,809

PATENTED DEC 4 1973 3,775,809

PATTY-FORMER

This application is a division of U.S. Pat. application Ser. No. 790,538, filed Jan. 13, 1969, now U.S. Pat. No. 3,594,854.

BACKGROUND OF THE INVENTION

For convenience, many housewives procure relatively large quantities of ground meat and the like, for freezing in home deep freezers. A drawback on this convenience is the time period required to thaw out the meat. Moreover, the exact amount of ground meat desired is rarely a match to the amount frozen. Accordingly, the housewife either has too much or too little ground meat.

The above problems can be overcome by forming the meat into patties before freezing. Patties are relatively easily defrosted as each patty constitutes a small frozen quantity. The exact amount of meat can be withdrawn when in patty form. The forming of the patties, however, is time consuming as it requires individual patty formation by hand and individual wrapping of each patty so as to prevent freezer burn. In addition, the patties tend to scatter and take up more than their share of room in the freezer.

BRIEF SUMMARY OF THE INVENTION

The present invention comprises a device which expedites the forming of patties and provides a compact and protective storage container for the patties so formed.

The invention comprises a tubular body member adapted to have ground meat packed therein. A plurality of parallel slots extend about a portion of the circumference of the body member. The slots are adapted to receive a divider plate and the meat is readily and conveniently formed into patties by inserting the divider plate through the slots and into and across the internal dimension of the body member.

The patties are individually separated from each other by a separating member releasably secured to the divider plate. Upon removal of the divider plate from the body member, the separating member remains between the patties. The separating member is provided with a release coating or is made of a material which is readily releasable from the frozen patty.

The body member is comprised of two semi-circular, complementary body portions. The body portions have one pair of edges integrally joined. The other pair of edges of the body portions are normally spring biased apart and are adapted to be releasably secured together by a series of locking pins.

After the individual patties are frozen, the body portions may be sprung apart so as to release the frozen patties. The body member may be open ended, and in such case, the patties may be discharged in single or desired quantities by pressing on the uppermost patty.

It is essential that the patties be cut sharply otherwise on freezing the patties would stick together at joined together areas. In order to provide a sharp cut, the wall of the body member is recessed in areas opposite the slots so as to receive the divider plates thereby minimizing the possibility of adjoining meat lodging between the divider plate and internal wall of the member. In addition, these recesses serve as a guide for the divider plate so as to prevent the divider plate from skewing and forming a patty of uneven thickness.

The body member is provided with top and bottom covers. The top cover frictionally and slidably engages the internal wall of the body member. The top cover can be adjusted to any position within the body member so that if only a few patties are formed, it can still engage the uppermost patty so as to protect and compact the meat contained therein.

DRAWINGS

DETAILED DESCRIPTION

Figure 1:
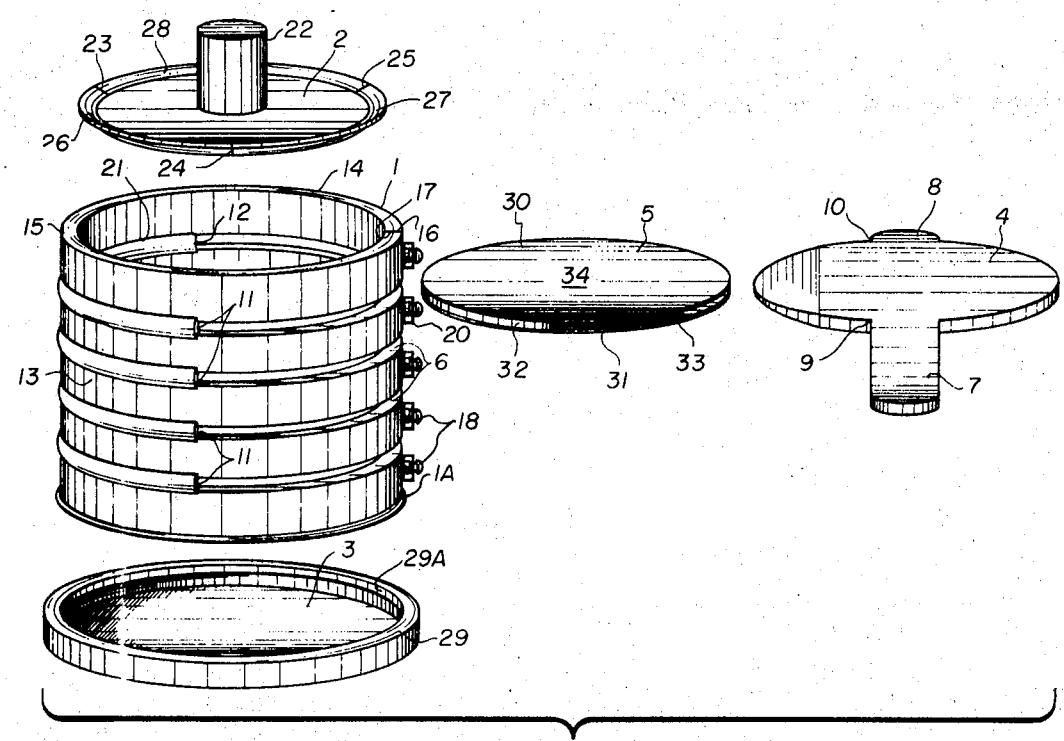
FIG. 1 is an exploded perspective view of the present invention.

Referring to FIG. 1, the invention comprises a tubular body member 1 having a top cover 2 and bottom cover 3. Body member 1 is adapted to have ground meat packed therein.

A divider plate 4 and separating envelope 5 are provided for slicing and separating the packed meat into patties. Body member 1 is provided with a plurality of slots 6 which are adapted to receive the divider plate 4 so as to slice the meat into patties. Envelope 5, which is releasably secured to divider plate 4, remains behind after withdrawal of the divider plate 4 so as to maintain the patties in a separated state.

Referring to FIG. 1, divider plate 4 includes a handle 7 and a protuberance 8. When the corner portions 9 and 10 adjacent handle 7 and protuberance 8 engage the ends 11 and 12 of a selected slot 6, the person forming the patty then knows that the divider plate 4 has been fully extended into the body member 1 and the patty has been sharply cut and further manipulation of the divider plate 4 is no longer required.

Figure 2:
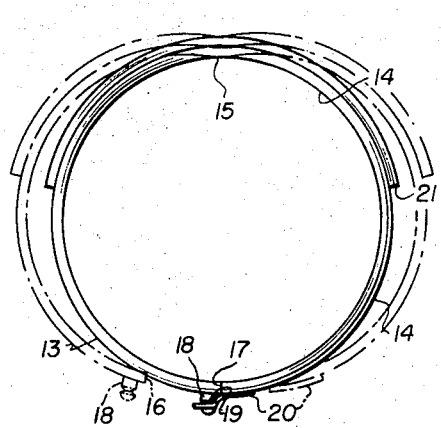
FIG. 2 is a plan view of the patty former of the present invention.

Referring to FIGS. 1 and 2, tubular member 1 is comprised of two complimentary semi-circular body portions 13 and 14 integrally joined together at 15. The natural springing tendency of portions 13 and 14 cause them to assume the broken line position shown in FIG. 2. The material forming body member 1 is preferably plastic and sufficiently flexible so that portions 13 and 14 may be moved toward each other until free edges 16 and 17 abut. A plurality of locking pins 18 projecting from portion 13 are adapted to be keyed in apertures 19 formed in locking tabs 20 which extend from free edge 17 of the portion 14.

After the patties are frozen, they may be readily removed from body member 1 by unkeying tabs 20 from locking pins 18.

Figure 2A:
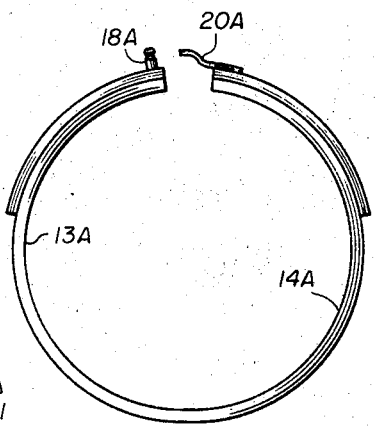
FIG. 2A is a plan view of a modified patty former of the present invention.

Referring to FIG. 2A, a modification of the present invention is shown wherein the slotted portions of body portions 13A and 14A are integrally joined and locking pins 18A and tabs 20A are located in a position diametrically opposite the position shown in FIGS. 1 and 2. This modification provides a much sturdier structure and, in addition reduces the required number of locking pins 18A and tabs 20A. The embodiment shown in FIGS. 1 and 2 requires locking pins 18 and tabs 20 intermediate each slot.

It is not essential that the present invention include body portions which are separable. In the alternative, the patties could be removed individually in any desired number by pressing on the top cover thereby ejecting any desired number of patties through the bottom. While not shown in FIG. 3, it is to be understood that the body member 1 could be tapered from top to bottom. More particularly, the internal dimension of body member 1 may be made to gradually increase from top to bottom so as to permit the patties to be more readily pushed through and out the bottom of body member 1.

Figure 3:
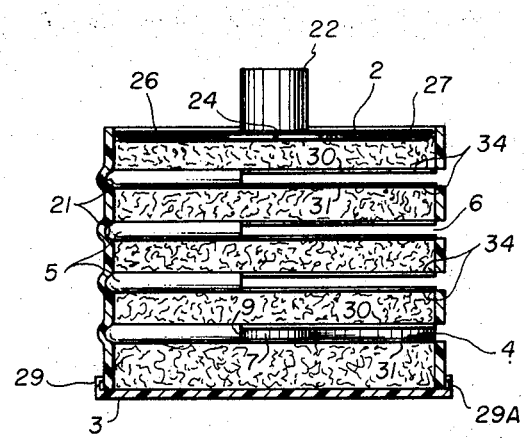
FIG. 3 is a vertical transverse section of the present invention.

Referring to FIGS. 1 and 3, slots 6 extend about one-half the circumference of body member 1. While only a limited number of slots 6 are shown, it is to be understood that any number of slots 6 may be provided and correspondingly, any number of patties formed.

Referring to FIGS. 1 and 3, recesses 21 in body member 1 extend from the ends of slots 6 about the other circumferential half of the body member 1. Recesses 21 permit the divider plate 3 to extend beyond the interior surface of body member 1 thereby sharply cutting and separating the patties from each other. Without a sharp cut, connected portions of adjacent patties would freeze together. In addition, the recesses 21 serve to guide the divider plate 4 into proper positions within the body member thereby assuring that the patties formed are of even thickness.

Cover 2 is adapted to be adjustly positioned within body member 1 in order to compact the meat so as to assure that it fills out body member 1 as it reuired in order to form consistent well shaped patties.

A handle 22 is provided for pushing down on cover 2. Cover 2 is preferably made of plastic and has splits 23, 24 and 25 extending inwardly from its outer periphery thereby defining spring fingers 26, 27, and 28 which releasably and adjustably lock the cover 2 to cover body member 1 by resiliently bearing against the inner surface of body member 1.

Bottom cover 3 is formed with a rim portion 29 which has an inwardly extending flange 29A. The cover 3 is made of plastic and rim portion 29 is of sufficient diameter and has sufficient flexability so that flange 29A releasably snaps over flange 1A which extends outwardly from the bottom edge of body member 1.

As hereinbefore described, separating envelope 5 is adapted to be releasably secured to the divider plate 4 so that upon removal of the divider plate 4, the separating envelope 5 is released and maintains the patties in a separated state (see FIG. 3). As hereinafter described, it is particularly constructed so as not to rip on being inserted and so as to readily released after withdrawal of divider plate 4.

Separating envelope 5 is formed of first and second sheets of material 30 and 31 which are joined along a portion of their pheripheries at 32. Opening 33 between the sheets 30 and 31 is of sufficient size to permit insertion of divider plate 4. Envelope 5 has a diameter corresponding to the internal diameter of body member 1 and conforming to the shape of divider plate 4. Due to the envelope conforming to divider plate 4, pressure applied to the envelope is distributed all along peripheral portion 32 thereby minimizing the possibility of the sheet tearing.

Separating envelope 5 is made of any desirable material such as paper, plastic, metal or the like. It may but not necessarily be of a material having sufficient rigidity so as to maintain the separated state shown in FIG. 3 thereby preventing the meat from flowing through slots 6.

If made of plastic, such as polyethylene, the sheets would inherently have sufficient character to release from a frozen patty. If material not inherently having such a release character is employed, it is preferred to apply a release coating 34 of silicone, wax or the like to prevent the patty from sticking thereto.

Figure 4:
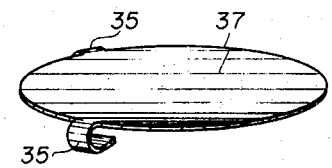
FIGS. 4 and 5 show modifications of the separating member used in the present invention.

Envelope 5 may take on any form so long as it is capable of being releasably secured to divider plate 4. Modifications are shown in FIGS. 4 and 5 wherein separating members 37 and 38 are shown having securing tabs 35 and securing slot 36, respectively.

The separating member 37 leaves exposed one surface of divider plate 4. Upon insertion of the plate into body member 1, the exposed surface will become wet. Care must be taken not to place the next separating member 37 on this wet side because the wet surface would cause the member to adhere thereto and not release.

Figure 5:
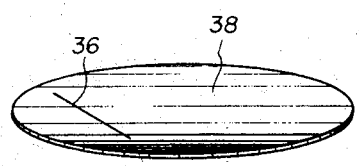
Figure 4A:
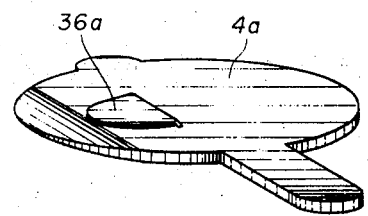
FIG. 4A shows a modified divider plate for use in inserting the separating member shown in FIG. 5.

Care must also be exercised with separating envelope 38 of FIG. 5 as all the pressure is applied to a small edge area of envelope 38. This tends to increase the possibility of tearing the separating envelope.

The separating envelope may be completely eliminated by providing a plurality divider plates 4. This however is not feasible. The distance separating adjacent slots 6 is usually less than one-half inch and therefore the handle protruding from an adjacent divider plate would interfere with grip and the handle of the divider plate being inserted. This is particularly true in view of the fact that the divider plate 4 can not be pushed directly into the body member 1. It must gradually be extended into the body member by reciprocating the divider plate 4 back and forth so as to assure a cutting action and so as to avoid a squashing action which tends to occur when the divider plate 4 is pushed in.

Accordingly, the only satisfactory method of eliminating the separating member is by providing a divider plate having a separable handle. Such modification is shown in FIG. 6.

Figure 6:
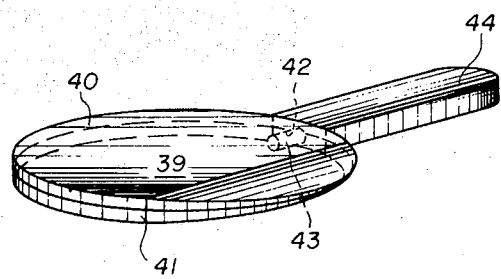
FIG. 6 shows a modification of the divider plated used in the present invention.

Referring to FIG. 6, the modified divider plate 39 is shown formed of two sheet members 40 and 41 having a bore 42 at one end. A pusher rod including a handle 44 having a male insert portion 43 adapted to be inserted into bore 42 is provided to push the divider plate 39 into body member 1. Insert portion 43 is of a diameter such that it is readily removable from bore 42 and thus divider plate 39 is adapted to be left wholly contained within a body member 1.

OPERATION

Ground meat is placed in member 1 and then compacted by pressing down on cover 2. A separating envelope 5 is then placed on divider plate 4. The divider plate 4 with envelope 5 thereon is then inserted through a selected slot 6 into and through body member 1. When corner portions 9 and 10 of the divider plate 4 engage the ends 11 and 12 of slot 6, the divider plate 4 has been fully extended through the body member 1. Divider plate 4 is then withdrawn leaving separating envelope 5 between adjacent patties.

Member 1 with the patties therein is ready to be inserted in a freezer. After freezing, and when it is desired to cook the patties, body portions 13 and 14 are sprung open thereby releasing the patties. If desired, any selected number of patties may be withdrawn from member 1 by leaving portions 13 and 14 latched together and by pressing down on the uppermost patty thereby discharging the patties individually through the bottom.

In view of the foregoing, it can be readily appreciated that the present invention provides a means for readily forming and storing patties with a minimum of effort and space required. A minimum of freezer paper is used. When it is desired to cook the patties, the selected number can readily be withdrawn.

The foregoing is considered illustrative only of the principles of the invention. Since numerous modifications and changes will readily occur to those skilled in the art, it is not desired to limit the invention to the exact construction and operation shown and described, and accordingly, all suitable modifications and equivalents may be resorted to, as falls within the scope of the appended claims.

What is claimed is:

1. A patty former for mastic material comprising:

a cylindrical thin walled resilient expandable chamber having a first closed position and a second open expanded position to facilitate removal of mastic material including a plurality of horizontal recesses in one side of said wall, the recesses being of a height less than the area between the recesses and extending through an arc of substantially 180°, a separating member being flat and circular in configuration and of a diameter substantially the same as the chamber and having a height of substantially the same size as the recesses, lacking any extensions therefrom and including an aperture in an edge thereof, said member being adapted to slice the mastic material into patties when it is placed into the recesses, said separating member lacking any extensions so that the cylindrical chamber is adapted to be removed from over the mastic material when the separating member is positioned therein, a flat positioning handle being of substantially the same thickness as the height of said separating member and including an insert portion extending therefrom said extension adapted to fit in the aperture, said handle adapted to be connected to said separating member so that said separating member can be placed into said recesses to slice the mastic material and said positioning handle can be removed when the cylindrical chamber is removed from over the mastic material, and a cover member having a diameter of substantially the same size as said chamber and being adapted to compact said mastic material.

2. A patty former as defined by claim 1, said body means including two complimentary body portions, latching means for releasably holding said portions together, said portions being normally spring biased to a separated position so that upon release of said latching means said patties may be readily removed.

3. A patty former as defined by claim 1, said body means including a discharge means for permitting individual discharge of said patties.

4. A patty former as defined by claim 1, said divider means including means for indicating when said patty has been fully sliced.

5. A patty former as defined by claim 1, said separating member including a release coating.

* * * * *